Oct. 29, 1963

YAHEI KIUCHI 3,108,480

UNIVERSAL SPEED CONVERTER

Filed Nov. 14, 1960

INVENTOR
YAHEI KIUCHI

BY *Wenderoth, Lind & Ponack*

ATTORNEYS

Oct. 29, 1963  YAHEI KIUCHI  3,108,480
UNIVERSAL SPEED CONVERTER

Filed Nov. 14, 1960

Inventor
Yahei Kiuchi
By
Wenderoth, Lind & Ponack
Attorneys

Oct. 29, 1963   YAHEI KIUCHI   3,108,480
UNIVERSAL SPEED CONVERTER
Filed Nov. 14, 1960   3 Sheets-Sheet 3

INVENTOR
YAHEI KIUCHI

BY Wenderoth, Lind & Ponack
ATTORNEYS ns. Patented Oct. 29, 1963

3,108,480
UNIVERSAL SPEED CONVERTER
Yahei Kiuchi, 34 Kitahorie Nibancho, Nishiku,
Osaka, Japan
Filed Nov. 14, 1960, Ser. No. 68,793
3 Claims. (Cl. 74—196)

This invention relates to a new type of universal speed converter.

It is an object of the present invention to provide a speed converter apparatus in which a round frictional plate which revolves with an output shaft as a single unit and which can slide freely on the output shaft is in frictional engagement with a frictional rotating plate or block which is rotated by an input shaft. By moving the frictional plate on the output shaft, the speed of rotation of the output shaft can be changed gradually.

The apparatus according to the present invention will be explained with reference to the accompanying drawings in which.

Figure 1:
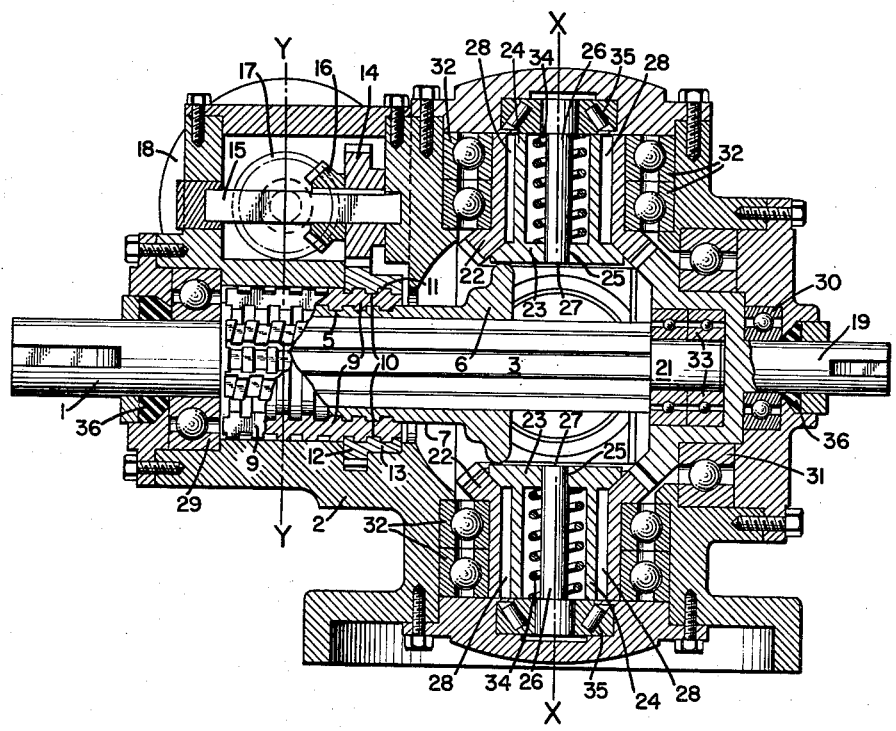
FIG. 1 is a vertical sectional view of the speed converter apparatus according to the present invention.
Figure 2:
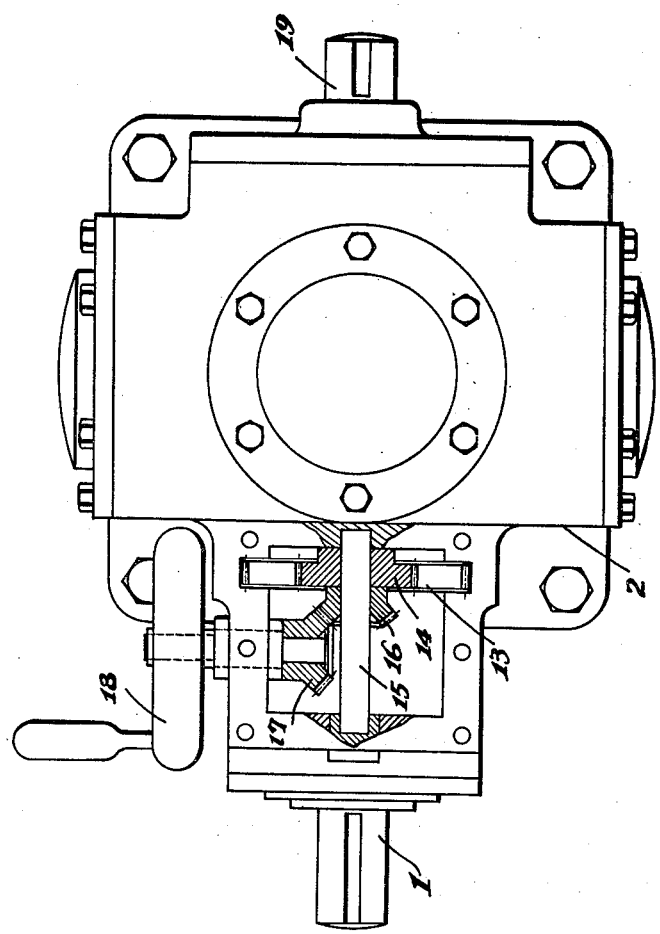
FIG. 2 is a plan view, partly in section, of the apparatus of FIG. 1.
Figure 3:
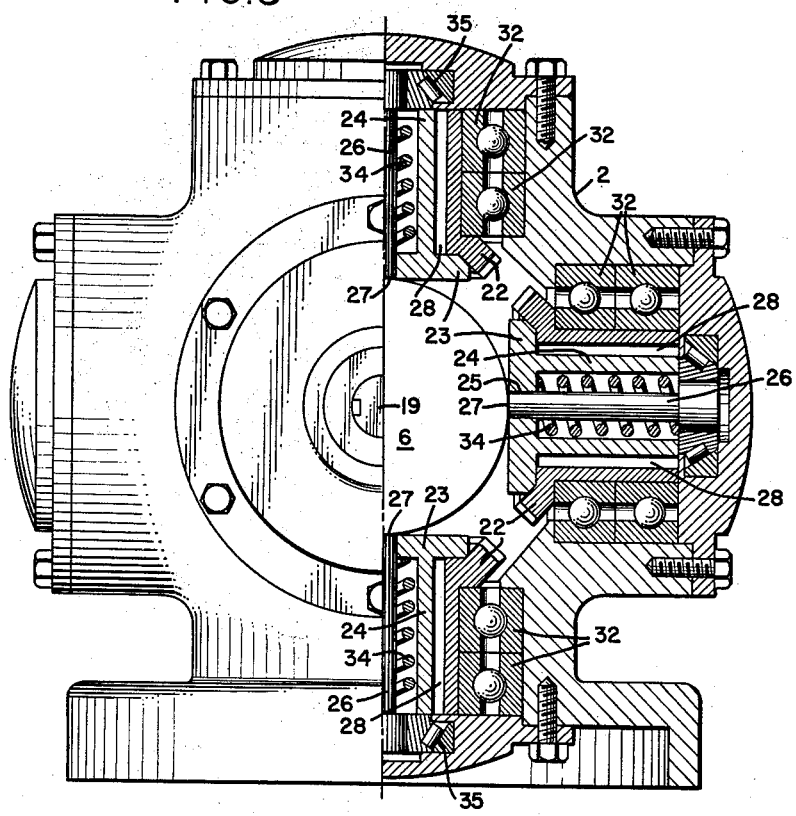
FIG. 3 is an end view of the apparatus, partly in section taken along line X—X of FIG. 1.
Figure 4:
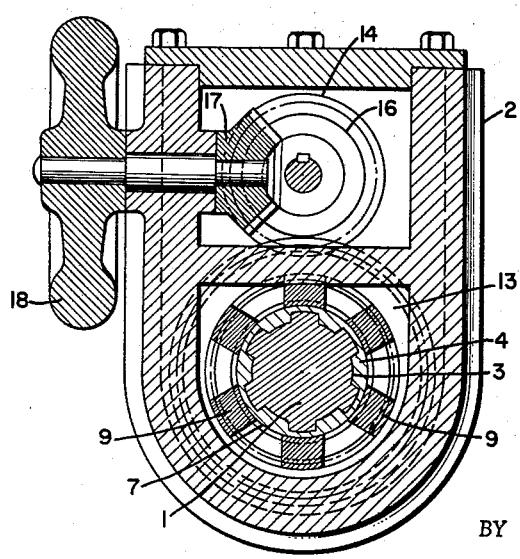
FIG. 4 is a sectional view taken along line Y—Y of FIG. 1.

As seen in the figures, the output shaft 1 of the speed converter of the present invention is rotatably mounted in the casing 2 in a bearing 29. A plurality of spline grooves 3 run longitudinally of the output shaft 1, and around the output shaft is a sleeve 7 having inwardly projecting splines 4 engaged in the spline grooves 3. On the outside surface of sleeve 7 are a plurality of circumferential grooves 5 which are at substantially right angles to the axis of the sleeve and the output shaft, and on the end of the sleeve toward the input shaft 19 is a large diameter friction disc 6. It will be seen that the friction disc 6, the sleeve 7 and the output shaft 1 rotate as a unit, while the sleeve 7 can slide along the output shaft. Around the sleeve 7 are a plurality of adjusting members 9 each having a plurality of inwardly projecting teeth thereon engaging in the grooves 5 on the exterior of the sleeve 7. On the exterior of said adjusting members 9 are a series of grooves 10 which with corresponding grooves on adjacent adjusting members form screw threads. Concentric with the adjusting members 9 is an annular spur gear 12 having screw threads 11 on the interior thereof meshing with the grooves 10 of the adjusting members 9. Spur gear 12 is rotatable in the casing 2, but can not move axially of the output shaft 1. Rotation of the spur gear 12 will therefore move the adjusting members axially of the output shaft 1 and will cause sleeve 7 to move axially of the output shaft 1 without moving the output shaft itself. Due to the cooperation of the inwardly projecting teeth on adjusting members 9 and the circular grooves 5 on the exterior of the sleeve 7, the sleeve can rotate within the adjusting members 9 and at the same time move back and forth along the output shaft with the adjusting members.

A spur gear 14 having teeth meshing with annular spur gear 12 is mounted on shaft 15 above the output shaft 1 and parallel to the output shaft 1. A pair of bevel gears 16 and 17 are provided, the bevel gear 16 being keyed to the shaft 15 with the spur gear 14 and the bevel gear 17 being mounted on a shaft with the handle 18 thereon, the handle shaft being rotatably mounted in the casing 2.

The input shaft 19 is mounted in the opposite end of the casing 2 from the output shaft 1 and runs in a bearing 30. On the inner end of the input shaft is a hollow bevel gear 20 which is rotatably mounted in bearing 31, in the hollow interior of which bevel gear are bearings 33 in which the end 21 of the output shaft 1 runs. Spaced around the periphery of the bevel gear 20 at 90° intervals are four bevel gears 22 which are rotatably mounted in the casing 2 in bearings 32. Within the hollow shafts of the bevel gears 22 are friction plate shafts 24 having splines 28 on the exterior thereof engaged with grooves on the interior of the shafts of the bevel gears 22. Idler shafts 26 have the outer ends thereof rotatably mounted in bearings 35 in the casing 2 and have the inner ends 27 extending through holes 25 in friction plates 23 mounted on the inner ends of the friction plate shafts 24. Since the friction plate shafts are splined to the bevel gear shafts, the friction plates 23 will rotate with the bevel gears 22, but the idler shaft will not rotate until the edge of the friction disc 6, which is normally in contact with the friction plates 23, is moved so that the edge is in contact with the ends 27 of the idler shafts 26. At this point the friction disc 6 will no longer be driven, but the rotational momentum thereof will rotate the idler shafts 26. Coil springs 34 are provided and press the friction plates 23 against the edge of the friction disc 6.

Oil seals 36 are provided around the input and output shafts.

In operation, the input shaft 19 is driven, which in turn drives the bevel gear 20 and from it the four bevel gears 22. Bevel gears 22 drive the friction plates 23 through the splines 28 and friction plate shafts 24. The springs 34 press the friction plates tightly against the edge of the friction disc 6, and the rotation of the friction disc 6 is transmitted to the output shaft 1 through the splines 4 engaging in the spline grooves 3 on the output shaft.

In order to change the speed of the output shaft, the handle 18 is rotated, which rotates the spur gear 14 through the bevel gears 16 and 17. The spur gear 14 in turn rotates the annular spur gear 12 and the threads 11 on the inside of the annular spur gear act in the grooves 10 in the adjusting members 9 to move the adjusting members toward or away from the input shaft end of the casing 2, depending on which way the handle 18 is rotated. The inwardly projecting teeth on the adjusting members 9 will transmit this motion to the sleeve 7 on which the friction disc 6 is mounted, thereby moving the friction disc 6 toward the center of the friction plates 23, which reduces the speed of the output shaft, or toward the periphery of the friction plates 23, which increases the speed of the output shaft. If the handle 18 is rotated enough so that the friction disc 6 moves onto the ends 27 of the idler shafts, the output shaft is no longer driven, but rather merely continues to rotate under whatever momentum conditions exist.

It will thus be seen that there has been provided an apparatus for changing speed which has a simple structure and which has accurately controlled speed adjusting means. The speed changer is a stepless type, which makes it useful not only for vehicles but for many other applications.

I claim:

1. A stepless speed change device, comprising a casing, an input shaft rotatably mounted in said casing, a bevel gear mounted on the end of said input shaft within said casing, a plurality of four idler shafts around the periphery of said casing extending radially of the axis of said input shaft, a bevel gear rotatable around each of said idler shafts and freely rotatably mounted in said casing and meshed with the bevel gear on said input shaft, friction plates engaged with each of said bevel gears, an output shaft rotatably mounted in said casing and aligned with said input shaft and extending into the space within the four friction plates, a friction disc on the said output shaft having an edge coming substantially to a point which is in frictional engagement with said friction plates, said friction disc being mounted on said output shaft for sliding movement only, and means engaged with said friction disc for sliding it along said output shaft.

2. A stepless speed change device as claimed in claim 1 in which each of said friction plates has a central aperture therein and each of said idler shafts has a flat end which extends through said friction plate aperture and has the end thereof flat and level with the surface of said friction plate with which said friction disc edge is engageable.

3. A stepless speed change device, comprising a casing, an input shaft rotatably mounted in said casing, a bevel gear mounted on the end of said input shaft within said casing, a plurality of four idler shafts around the periphery of said casing extending radially of the axis of said input shaft, a bevel gear rotatable around each of said idler shafts and freely rotatably mounted in said casing and meshed with the bevel gear on said input shaft, friction plates engaged with each of said bevel gears, an output shaft rotatably mounted in said casing and aligned with said input shaft and extending into the space within the four friction plates, a friction disc on the said output shaft having an edge coming substantially to a point which is in frictional engagement with said friction plates, said friction disc being mounted on said output shaft for sliding movement only, and means engaged with said friction disc for sliding it along said output shaft and comprising an internally splined sleeve around said output shaft and on one end of which said friction disc is mounted, said output shaft having splines thereon with which said internally splined sleeve is in sliding engagement, said internally splined sleeve having a plurality of spaced circumferential grooves on the exterior surface thereof, a plurality of adjusting members around the periphery of said internally splined sleeve and having a plurality of inwardly projecting teeth on the inside thereof engaging in said grooves on said internally splined sleeve and having a plurality of grooves on the exterior thereof the grooves of successive members together forming a screw thread, an annular spur gear rotatably mounted in said casing and having screw threads on the inside thereof meshed with the grooves on said adjusting members, and gear means actuable from exteriorly of said casing meshed with said spur gear for rotating said spur gear to move said adjusting members together with said internally splined sleeve axially of said output shaft.

References Cited in the file of this patent
UNITED STATES PATENTS

| | | |
|---|---|---|
| 648,235 | Bullard | Apr. 24, 1900 |
| 871,132 | Manning | Nov. 19, 1907 |
| 908,293 | Manning | Dec. 29, 1908 |
| 1,052,692 | Reason | Feb. 11, 1913 |
| 1,517,552 | Fite | Dec. 2, 1924 |
| 2,057,482 | Erban | Oct. 13, 1936 |